United States Patent
Sakata et al.

(10) Patent No.: US 6,922,383 B2
(45) Date of Patent: Jul. 26, 2005

(54) RECORDING APPARATUS WITH LIGHT POWER CONTROL FOR USE WITH OPTICAL RECORDING MEDIUM AND METHOD THEREOF

(75) Inventors: Haruyasu Sakata, Tokorozawa (JP); Hiroyuki Tanaka, Tokorozawa (JP); Mitsuru Yoshida, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 350 days.

(21) Appl. No.: 09/986,686

(22) Filed: Nov. 9, 2001

(65) Prior Publication Data

US 2002/0064114 A1 May 30, 2002

(30) Foreign Application Priority Data

Nov. 10, 2000 (JP) .......................................... 2000-344148

(51) Int. Cl.[7] .............................................. G11B 7/125
(52) U.S. Cl. .................................. 369/53.26; 369/47.51
(58) Field of Search ........................... 369/53.26, 53.27, 369/53.18, 47.51, 47.52, 53.37, 53.2, 53.22

(56) References Cited

U.S. PATENT DOCUMENTS

| | | | |
|---|---|---|---|
| 4,858,220 A | | 8/1989 | Funada |
| 5,233,596 A | * | 8/1993 | Tani ............................. 369/116 |
| 5,274,622 A | * | 12/1993 | Kono .......................... 369/116 |
| 5,383,208 A | | 1/1995 | Queniat et al. |
| 5,455,717 A | * | 10/1995 | Van Doorn et al. .............. 360/6 |
| 5,625,616 A | * | 4/1997 | Koike et al. .............. 369/53.26 |
| 5,742,566 A | * | 4/1998 | Imai ........................ 369/13.54 |
| 6,671,248 B2 | * | 12/2003 | Miyabata et al. ........... 369/116 |

FOREIGN PATENT DOCUMENTS

| | | | | |
|---|---|---|---|---|
| JP | 60-251731 | 12/1985 | | |
| JP | 4-320384 | 11/1992 | | |
| JP | 04320384 A | * 11/1992 | ........... H01S/3/096 |

* cited by examiner

Primary Examiner—Brian E. Miller
Assistant Examiner—Peter Vincent Agustin
(74) Attorney, Agent, or Firm—Sughrue Mion, PLLC

(57) ABSTRACT

An optical recording apparatus includes a light source driving unit for driving a light source; an emitted light power detecting unit for detecting an emitted light power; a temperature detecting unit for detecting a temperature of the light source; a light power control unit for adjusting a driving current of the light source such that a change rate of an emitted light power detection value fall within a predetermined range; and a detection value storing unit for storing a driving current adjustment value in association with a temperature detection value. The light power control unit adjusts the driving current value of the light source based on an stored detection value when the temperature detection value is within a range of temperature detection values already stored in the detection value storing unit.

6 Claims, 4 Drawing Sheets

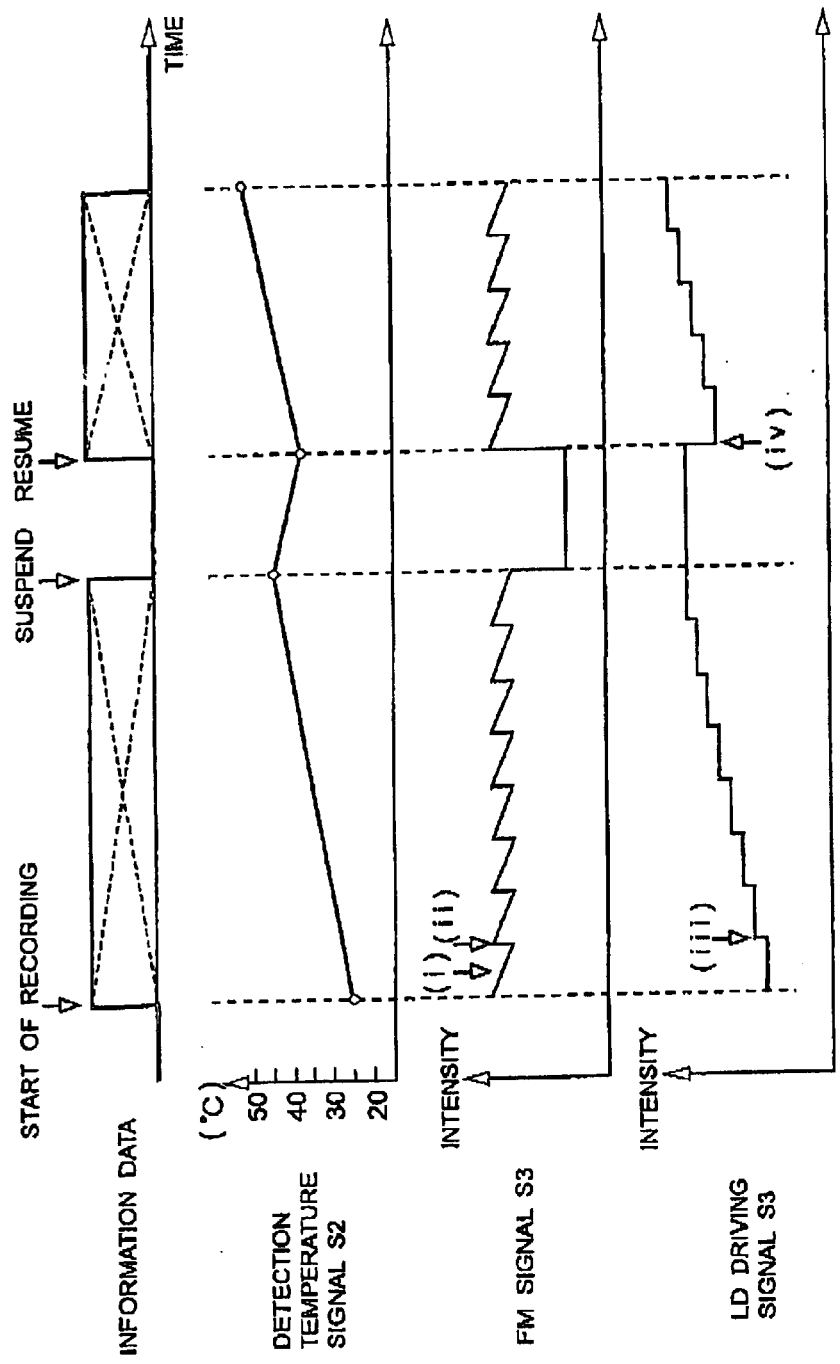

RECORDING APPARATUS WITH LIGHT POWER CONTROL FOR USE WITH OPTICAL RECORDING MEDIUM AND METHOD THEREOF

BACKGROUND OF THE INVENTION

1. Field of the Invention

The present invention relates to an apparatus and method for performing recordation by irradiating a light beam to a recording medium.

2. Description of the Related Art

It is necessary to control an emission power of a light source (laser diode or the like) to maintain a predetermined constant value during recording operation in order to achieve a satisfactory reproduction performance with a recording and/or reproducing apparatus or an optical disc drive for use with a recordable or rewritable optical disc, such as a DVD-R (Digital Versatile Disc-Recordable), a CD-R (Compact Disc-Recordable), a DVD-RW (DVD-Rewritable), and a CD-RW (CD-Rewritable).

Conventionally, the laser diode is driven by a driving current which is servo-controlled so as to maintain light power at a constant level when reading from an optical disc. When performing recording, the driving current is added with a current necessary to achieve a light power for recording while performing the servo control. FIG. 1 shows power characteristics of the laser diode which is dependent on the temperature of the laser diode. More specifically, the drawing shows a relation of light power (L) versus driving current (Id) in terms of the temperature of the laser diode as a parameter. Light power of the laser diode increases approximately linearly with respect to a driving current when the driving current is larger than an oscillation threshold value (Ith). As the temperature of the laser diode increases, the oscillation threshold value increases while slope efficiency or external differential quantum efficiency ($\eta d[W/A]$) representing a gradient of the characteristics curve decreases.

It is a problem in the above-described conventional driving method of the laser diode that recording light power varies even when the recording is performed intermittently because the external differential quantum efficiency of the laser diode varies as the temperature of the laser diode changes. It is another problem in the conventional driving method that the individual differences among laser diodes cause variations in light power during recording operation, because the temperature dependence of the laser diode characteristics varies from element to element.

OBJECT AND SUMMARY OF THE INVENTION

The present invention has been made to overcome the above-described problems, and it is an object of the present invention to provide an optical recording apparatus capable of performing a light power control with high accuracy in a stable manner even when performing the recording intermittently and regardless of a length of intermittent time intervals, and a method thereof.

To achieve the object, according to one aspect of the present invention, there is provided an optical recording apparatus for performing recording by irradiating a light beam emitted from a light source to a recording medium, which comprises a light source driving portion for driving the light source; an emitted light power detecting portion for detecting an emitted light power from the light source; a temperature detecting portion for detecting a temperature of the light source; a light power control portion for adjusting a driving current of the light source such that a change rate of an emitted light power detection value from the emitted light power detecting portion fall within a predetermined range; and a detection value storing portion for storing a driving current adjustment value from the light power control portion and a temperature detection value from the temperature detecting portion in an associated manner, wherein the light power control portion adjusts the driving current value of the light source based on an stored detection value in the detection value storing portion when the temperature detection value is within a range of temperature detection values already stored in the detection value storing portion.

According to another aspect of the present invention, there is provided a recording method of an optical recording apparatus for performing recording by irradiating a light beam emitted from a light source to a recording medium, which comprises light source driving step of driving the light source; emitted light power detecting step of detecting an emitted light power from the light source; temperature detecting step of detecting a temperature of the light source; light power control step of adjusting a driving current of the light source such that a change rate of an emitted light power detection value in the emitted light power detecting step fall within a predetermined range; and detection value storing step of storing a driving current adjustment value in the light power control step and a temperature detection value obtained in the temperature detecting step in an associated manner, wherein the light power control step adjusts the driving current of the light source based on an stored detection value in the detection value storing step when the temperature detection value is within a range of temperature detection values already stored in the detection value storing step.

BRIEF DESCRIPTION OF THE DRAWINGS

FIG. 4 is a time chart showing one example of the light power control operation of the laser diode when performing intermittent recording.

DETAILED DESCRIPTION OF THE PREFERRED EMBODIMENTS

Figure 1:
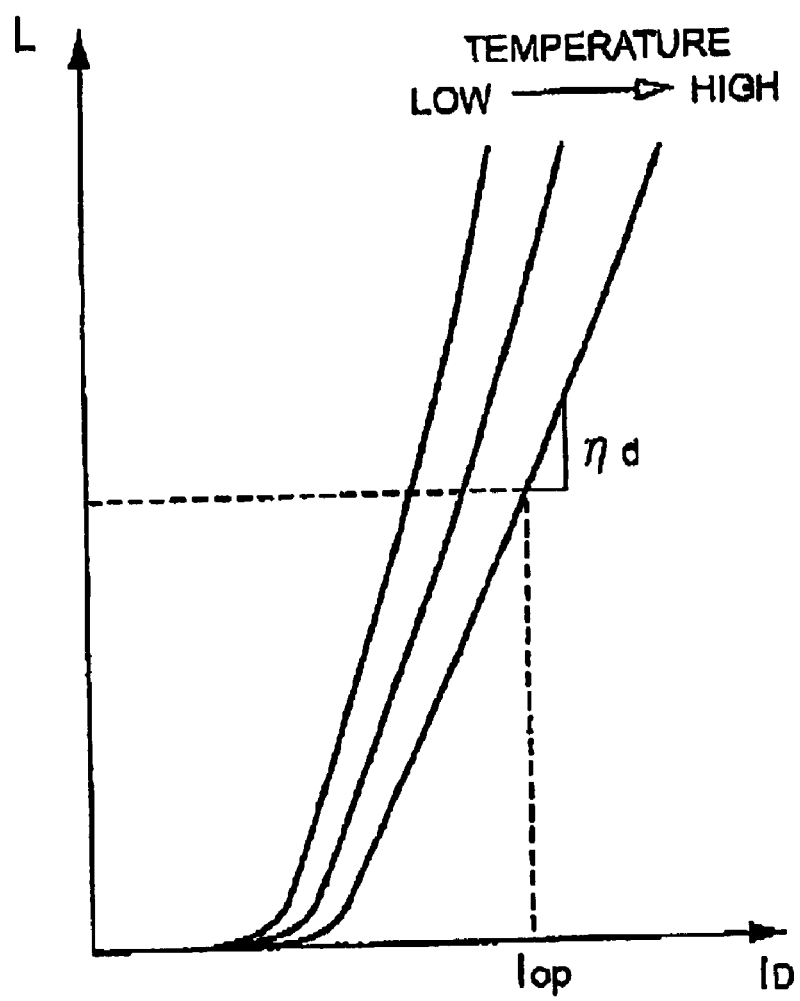
FIG. 1 shows temperature dependence of optical power characteristics of a laser diode wherein a relation of light power (L) versus a driving current (Id) is illustrated while using a temperature as a parameter.

The following description will describe one embodiment of the present invention with reference to the accompanying drawings, in which substantially equivalent components are labeled with like reference numerals for simplicity of description.

Figure 2:
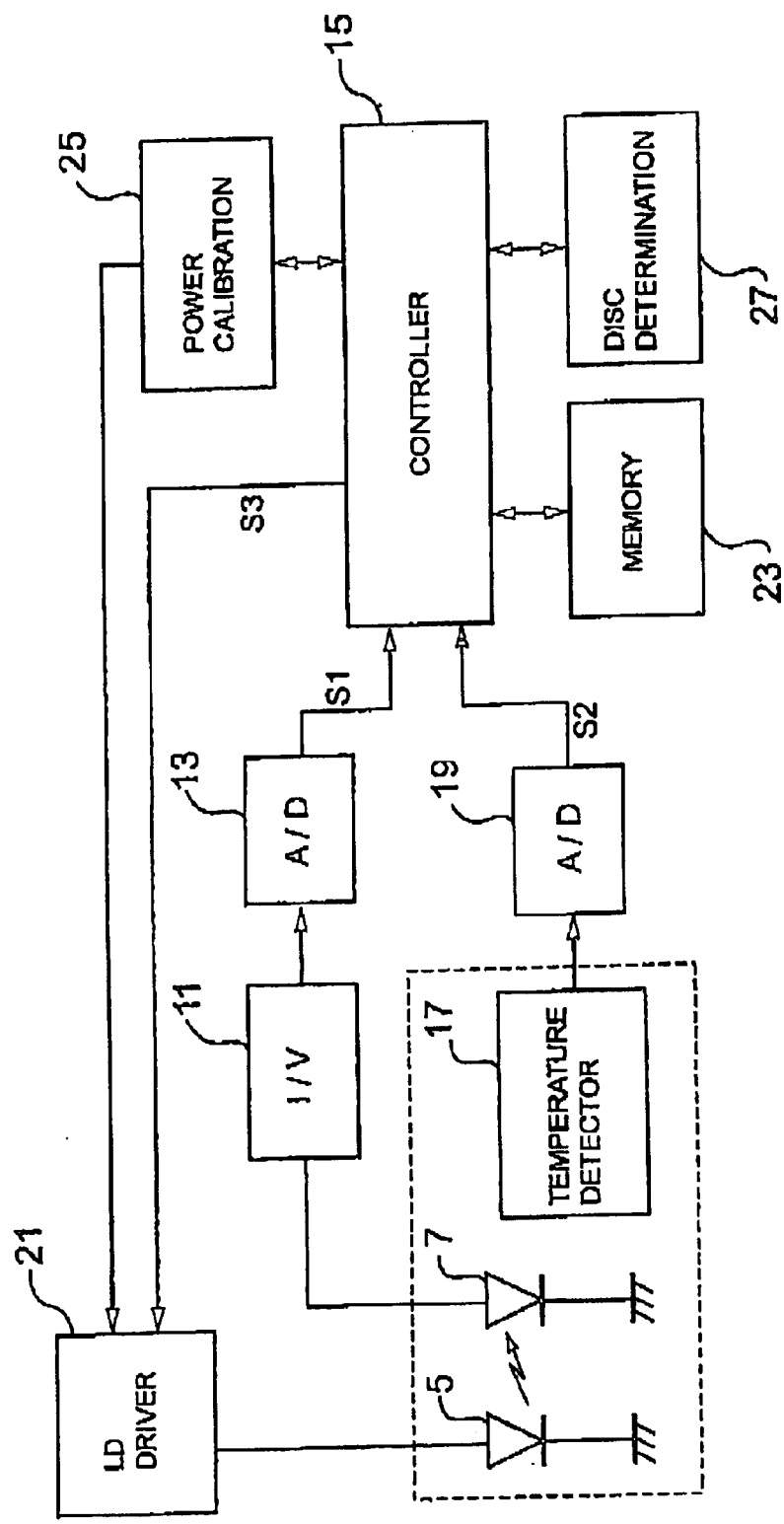
FIG. 2 is a block diagram illustrating a configuration of an optical recording apparatus according to one embodiment of the present invention.

FIG. 2 is a block diagram illustrating a configuration of an optical recording apparatus 10 according to one embodiment of the present invention. In the drawing, a laser diode 5 serving as a light source is provided in an optical pick-up (not shown) and emits a beam of laser light irradiated to an optical disc, such as a DVD-R and a DVD-RW. Also, a light detector 7 (front monitor detector: FMD) detects output power of laser light emitted from the laser diode 5 (that is, front output light) to the optical disc. A monitor current signal representing light power detected by the front monitor detector 7 is converted to a voltage signal by a current-to-voltage (I/V) converter 11 first, and then is converted to a digital signal by an analog-to-digital (A/D) converter 13. A front monitor signal S1 obtained by these conversions is supplied to a controller 15.

A temperature detector 17 for detecting a temperature of the laser diode 5 is provided in the vicinity of the laser diode 5 in the optical pick-up. A detection signal from the temperature detector 17 is supplied to an analog-to-digital (A/D) converter 19 and converted into a digital signal. A temperature detection signal S2 obtained by the conversion is supplied to the controller 15.

The controller 15 determines a driving current of the laser diode 5 based on the front monitor signal S1 and the temperature detection signal S2 to send a laser-diode (LD) driving control signal S3 specifying the driving current to an LD driver 21. Alternatively, the controller 15 determines the driving current of the laser diode 5 based on a content stored in a storage device 23 (hereinafter, referred to simply as a memory) including a ROM (Read Only Memory) and a RAM (Random Access Memory) to send the LD driving control signal S3 specifying the driving current to the LD driver 21.

A power calibration circuit 25 finds optimal recording light intensity by performing power calibration described below for an optical disc loaded in the optical recording apparatus 10 under the control of the controller 15. The result thus obtained is supplied to the controller 15. A disc determination circuit 27 determines whether an optical disc is loaded into (or removed from) the optical recording apparatus 10 or not to send the determination result to the controller 15.

Figure 3:
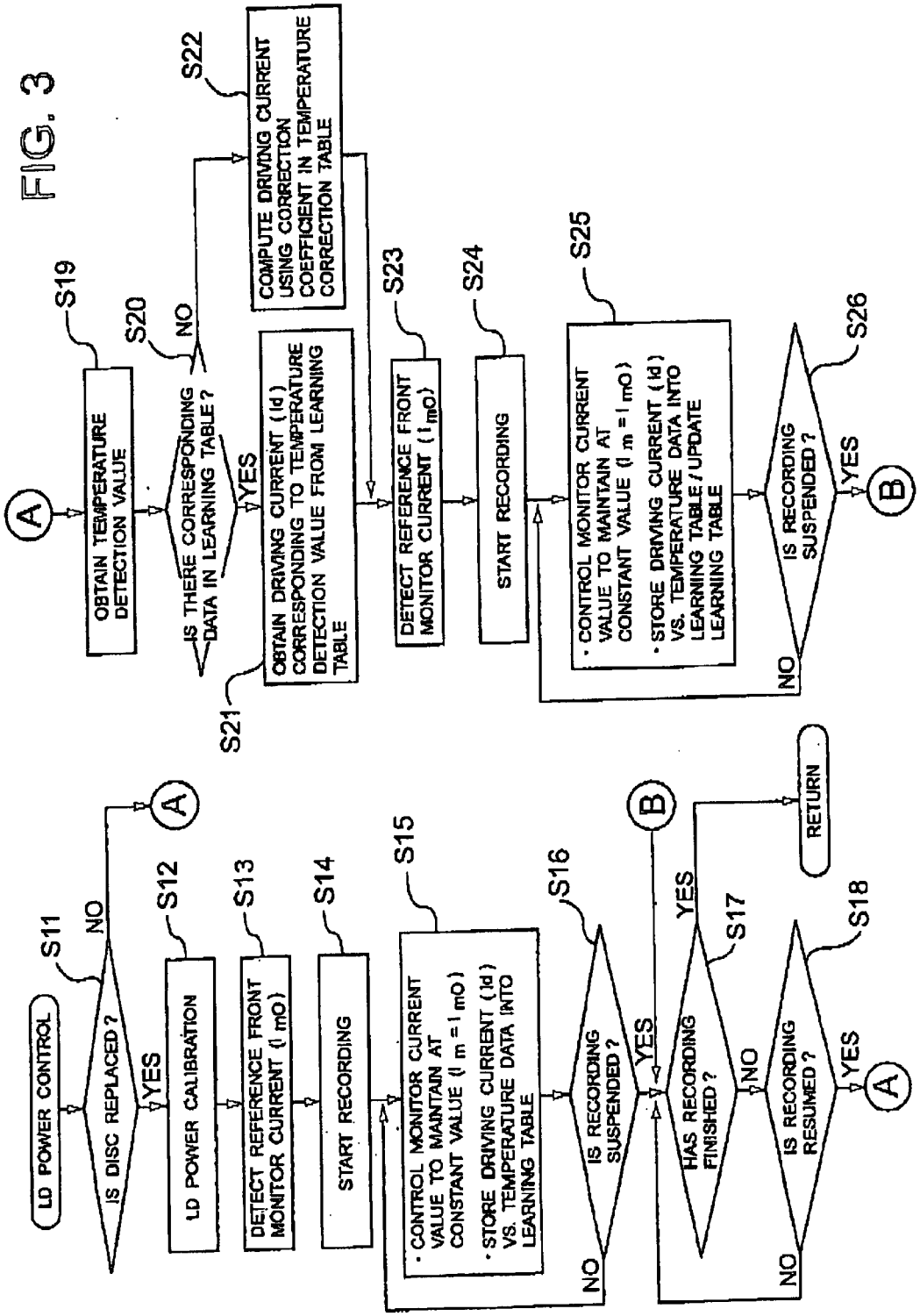
FIG. 3 is a flowchart detailing an operation procedure of the optical recording apparatus according to one embodiment of the present invention when performing a light power control of the laser diode during recording operation.

With reference to the flowchart of FIG. 3 and the time chart of FIG. 4, an operation of the above-described optical recording apparatus 10 when performing the light power control of the laser diode 5 during recording operation. The operation is performed under the control of the controller 15.

The controller 15 determines whether a disc is replaced (or newly loaded) in the optical recording apparatus 10 (Step S11). In this instance, the controller 15 may identify the disc itself by reading out information or the like recorded on the disc, or determine the opening of a disc tray or the like. Upon determining that the disc is neither replaced nor newly loaded, the controller 15 skips to Step S19 and beyond for further operation. On the other hand, when it is determined that the disc is replaced or newly loaded, the controller 15 proceeds to the following steps to find a reference value for optimal recording light intensity and the recording light power control.

Initially, the power calibration circuit 25 sends the driving signal to the LD driver 21, so that trial recording on the optical disc is performed by driving the laser diode 5. Herein, trial data to be recorded depends on an information data recording format of the optical disc, and for example, data having a pit length of 3T to 11T (T: channel bit length) is used. Optimal light power for the recording is found by performing the trial recording as discussed above while changing light power (Step S12).

Subsequently, the controller 15 drives the laser diode 5 to achieve the optimal light power. The front light power of the laser diode 5 during recording operation is monitored by the front monitor detector 7 to detect a reference monitor current ($I_{mo}$) (Step S13). The controller 15, then, starts the recording of information data on the optical disc (Step S14). The controller 15 control such that a front monitor current (FM current: $I_m$) from the front monitor detector 7 is maintained at the reference monitor current ($I_{mo}$). The controller 15 may control the front monitor current ($I_m$) or the change rate of the current ($I_m$) so as to fall within a predetermined range. The controller 15 stores temperature detection values and the corresponding driving current values (Id) of the laser diode 5 during the control operation into a learning table in an associated manner in the memory 23 as storage data (Step S15).

As an example of the above control operation, the light power control of the laser diode 5 during intermittent recording is shown in FIG. 4. In this example, 25° C. is given as a temperature corresponding to the intensity of the detection temperature signal S2 at the start of the recording of the information data, and the temperature increases gradually as the recording proceeds. The light power of the laser diode 5 decreases as the temperature increases ((i) in FIG. 4). When a change (i.e., a decrease, in this example) of the light power reaches a predetermined ratio ((ii) in FIG. 4), the controller 15 changes (i.e., increases) the driving current (Id) of the laser diode 5 ((iii) in FIG. 4), thereby making an adjustment so that the front monitor current ($I_m$) of the front monitor detector 7 is substantially equal to the reference monitor current ($I_{mo}$) ((ii) in FIG. 4). The controller 15 stores the temperature detection values and the corresponding driving current adjustment values obtained during the control operation into the learning table in a one-to-one correspondence.

The controller 15 determines whether the recording operation is suspended or not (Step S16). When it is determined that the recording operation is not suspended, control is returned to Step S15, and the controller 15 adjusts the light power and stores the data into the learning table again in the manner discussed above while performing the information data recording.

When it is determined that the recording operation is suspended in Step S16, the controller 15 further determines whether the recording has finished or not (Step S17). Upon determining that the recording has finished in this step, control exits this sub-routine and returns to the main routine. Upon determining otherwise, the controller 15 determines whether the recording is resumed or not (Step S18). Upon determining that the recording is not resumed, control returns to Step S17 and repeats Steps S17 and S18.

Upon determining that the recording operation is resumed in Step S18, the controller 15 obtains a current temperature detection value from the temperature detector 17 (Step S19). Then, the controller 15 determines whether the detection temperature data and the corresponding driving current data are already stored in the learning table (Step S20). Upon determining that the data are already stored in the learning table, the controller 15 acquires the driving current data corresponding to the detection temperature data from the learning table (Step S21). Upon determining that the learning table has no driving current data corresponding to the detection temperature data in Step S20, the controller 15 computes a driving current by using a correction coefficient in a temperature correction table pre-stored in another region of the memory 23 besides the learning table (Step S22). Herein, in a case where it is determined that there is no change in temperature when the recording was suspended, data at the time of suspension may be used.

Then, the controller 15 drives the laser diode 5 with the driving current value, and detects the reference monitor current ($I_{mo}$) (Step S23). Subsequently, the controller 15 starts the recording of the information data on the optical disc (Step S24: (iv) in FIG. 4). The controller 15 controls such that the front monitor current ($I_m$) of the front monitor detector 7 is maintained at the reference monitor current ($I_{mo}$). Also, the controller 15 stores the detection temperature data and the driving current (Id) data of the laser diode 5 during the control operation into the learning table in the memory 23, or updates the learning table with the data (Step S25).

The controller 15 determines whether the recording operation is suspended or not (Step S26). Upon determining that the recording is not suspended, the controller 15 returns to Step S25, and adjusts the light power and stores the data into the learning table again in the manner discussed above while performing the information data recording.

Upon determining that the recording operation is suspended in Step S26, the controller 15 returns to Step S17, and repeats Step S17 and beyond. By following the procedure discussed as above, the light power control of the laser diode 5 during recording operation is performed.

The embodiment is described above for a case where the driving current value of the laser diode 5 is adjusted by using the stored detection temperature data and the driving current (Id) data themselves. It should be appreciated, however, that it may be arranged in such a manner that an interpolation value of the stored detection temperature data and driving current (Id) data is computed, so that the driving current value of the laser diode 5 is adjusted based on the interpolation value.

As has been described in detail, the temperature of the laser diode 5 and the front output light from the laser diode 5 are monitored, and the driving current during recording is adjusted such that the monitor current value (that is, emission light power) is within a predetermined range, while at the same time, the temperature detection value and the driving current adjustment value are stored into the learning table (memory) to be used as reference data at the time of adjustment later.

The driving current is controlled based on the data stored in the learning table during intermittent recording after the recording operation is suspended. Hence, it is possible to perform the light power control with high accuracy in a stable manner even when the recording is performed intermittently and regardless of a length of intermittent time intervals. In addition, because the predetermined temperature correction coefficient table is provided, in the event that the current temperature is out of the range of the stored temperature detection values and no effective learning data is available, it is possible to perform the light power control with high accuracy in a stable manner by using a predetermined correction coefficient while monitoring the front emission light from the laser diode 5.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on a Japanese Patent Application No. 2000-344148 which is hereby incorporated by reference.

What is claimed is:

1. An optical recording apparatus for performing recording by irradiating a light beam emitted from a light source to a recording medium, comprising:

a light source driving portion for driving said light source;

an emitted light power detecting portion for detecting an emitted light power from said light source;

a temperature detecting portion for detecting a temperature of said light source;

a light power control portion for adjusting a driving current of said light source such that a change rate of an emitted light power detection value from said emitted light power detecting portion falls within a predetermined range;

a detection value storing portion for storing a driving current adjustment value from said light power control portion and a temperature detection value from said temperature detecting portion in an associated manner; and a medium determining portion for determining whether the recording medium is newly loaded or not;

wherein said light power control portion adjusts the driving current value of said light source based on a stored detection value in said detection value storing portion when the temperature detection value is within a range of temperature detection values already stored in said detection value storing portion; and wherein said detection value storing portion updates the stored detection value with a new detection value when said medium determining portion determines that the recording medium is newly loaded.

2. An optical recording apparatus according to claim 1, further comprising:

a correction coefficient storing portion for storing a correction coefficient for the driving current value corresponding to the temperature of said light source in advance, wherein said light power control portion adjusts the driving current value of said light source by using the correction coefficient already stored in said correction coefficient storing portion when the driving current adjustment value corresponding to a current temperature detection value is not stored in said detection value storing portion.

3. An optical recording apparatus according to claim 1, wherein:

said light power control portion computes an interpolation value of the stored detection value to adjust the driving current of said light source based on the interpolation value.

4. A recording method of an optical recording apparatus for performing recording by irradiating a light beam emitted from a light source to a recording medium, comprising:

a light source driving step of driving said light source;

an emitted light power detecting step of detecting an emitted light power from said light source;

a temperature detecting step of detecting a temperature of said light source;

a light power control step of adjusting a driving current of said light source such that a change rate of an emitted light power detection value in said emitted light power detecting step fall within a predetermined range;

a detection value storing step of storing a driving current adjustment value in said light power control step in association with a temperature detection value obtained in said temperature detecting step; and a medium determining step of determining whether the recording medium is newly loaded or not;

wherein said light power control step adjusts the driving current of said light source based on a stored detection value in said detection value storing step when the temperature detection value is within a range of temperature detection values already stored in said detection value storing step; and wherein said detection value storing step updates the stored detection value with a new detection value when it is determined that the recording medium is newly loaded in said medium determining step.

5. A method according to claim 4, further comprising:

a correction coefficient storing step of storing a correction coefficient for the driving current value corresponding to the temperature of said light source in advance, wherein said light power control step adjusts the driving current of said light source by using the correction coefficient already stored in said correction coefficient storing step when the driving current adjustment value corresponding to a current temperature detection value is not stored in said detection value storing step.

6. A method according to claim 4, wherein:

said light power control step computes an interpolation value of the stored detection value to adjust the driving current of said light source based on the interpolation value.

* * * * *